United States Patent Office 3,453,320
Patented July 1, 1969

3,453,320
METHALLYL SULFONATE SALT PRODUCTION
Max O. Robeson, Salisbury, N.C., assignor to Proctor Chemical Company, Inc., Salisbury, N.C., a corporation of North Carolina
No Drawing. Filed Apr. 1, 1968, Ser. No. 717,963
Int. Cl. C07c *143/16*
U.S. Cl. 260—513                                4 Claims

ABSTRACT OF THE DISCLOSURE

Alkali metal methallyl sulfonate is obtained as a product containing less than 1% of alkali metal chloride contaminate in a single crystallization from the reaction liquor formed by reaction of alkali metal sulfite with methallyl chloride in aqueous medium. The high purity product recovery in high yield results from use of a controlled water content and mole ratio of reactants and product crystallization at 8 to 15° C. The product can be used to form copolymers, to treat fabrics for finishing effects, etc.

BACKGROUND OF THE INVENTION

Alkali metal methallyl sulfonates may be prepared by reaction of the corresponding alkali metal sulfite with methallyl chloride in aqueous medium. Production of the sodium salt by this method can be represented by the following equation:

In carrying out this reaction for commercial production of the desired methallyl sulfonate salt, it is, of course, important to obtain a good yield of the product in terms of the quantity of reactants employed. As can be seen from the foregoing equation, however, such methallyl sulfonate salt production involves also the problem of obtaining a product with a minimum amount of by-product sodium chloride as a contaminant. Recrystallization or other purification techniques may, of course, be used to eliminate alkali metal chloride which may occur as a contamination in the desired product. However, such operations invariably lead to increased production costs and some loss of desired product resulting in overall reduction in product yield. Manufacturers of methallyl sulfonate salts of the alkali metals, therefore, have need of improvements in the general production operation described above in order to manufacture the product with a reasonably high yield and containing a minimum amount of by-product salt contamination in as direct a method as possible.

OBJECTS

A principal object of this invention is improvements in methods for the production of alkali metal methallyl sulfonate salts. Further objects include the provision of:

(1) Improved techniques in the manufacture of methallyl sulfonate salts of alkali metals to produce desired product with a minimum of by-product salt contamination using a single crystallization step.

(2) Improvements in methallyl sulfonate salt production which streamline the process, afford high purity of product and maintain low alkali metal chloride content.

(3) Production of alkali metal methallyl sulfonates containing less than 1% by-product akali metal chloride contamination as a single crop of crystals from a liquid reaction phase in a yield above 75% of theory.

SUMMARY OF THE INVENTION

These objects are accomplished according to the present invention through the preparation of alkali metal methallyl sulfonate by reaction in aqueous medium of alkali metal sulfite with methallyl chloride using an alkali metal sulfite to methallyl chloride mole ratio between 1.3 to 1 and 1.1 to 1 and, at the same time, using an amount of water in the reaction mass in excess of that which will provide the highest yield of the sulfonate salt. These conditions are coupled with recovery of the desired product from the reaction mass by a single crystallization performed with the temperature of the reaction mass adjusted to between 8 and 15° C. This causes formation of crystals of the product sulfonate which are then centrifuged from the liquid phase, producing product in yield between about 75.5 to 79% of theory with the crystal product containing less than 1% of by-product alkali metal chloride.

The success of the present invention is due to several discoveries concerning methallyl sulfonate salt production. First, the amount of water used in forming the aqueous reaction medium is not, for the sake of producing product having a minimum of by-product salt contamination, the amount of water which will produce the highest yield of product. In other words, it has been found that the amount of water used in accordance with the invention is not the optimum in terms of product yield.

A second discovery of the invention is that the mole ratio of rectants employed is critical with regard to the obtainment of methallyl sulfonate salt having a minimum of by-product salt contamination. It was found that with a 1 to 1 mole ratio of methallyl chloride to alkali metal sulfite, by-product salt contamination is substantially increased over the minimum amount obtainable in accordance with the invention. This appears to be due to hydrolyis of methallyl chloride resulting in liberation of hydrochloric acid. This acid condition causes rapid deterioration of sodium methallyl sulfonate. The use of an excess of alkali metal sulfite maintains a near neutral condition which has been found to favorably influence reaction with regard to amount of contamination with by-product salt upon a single crystallization recovery of desired product. Using a mole ratio of between 1.1 to 1.3 to 1 of the alkali metal sulfate to methallyl chloride, one can obtain in a single crystallization operation well formed white crystalline product containing a minimum of alkali metal chloride and no alkali metal sulfite. This latter condition is determined by bromide-bromate titration on the final product.

The temperature of crystallization has also been found to be important, i.e., a temperature within the range 8° to 15° C. in conjunction with the water amount control and reactant mole ratio control as noted, makes it possible to form the desired product and isolate it merely by crystallization and centrifuging. This eliminates need for evaporation of water or solvent and other purification steps.

DESCRIPTION OF PREFERRED EMBODIMENTS

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

Example 1

| Charge | Percent | Mole ratio |
|---|---|---|
| (A) 6,600 parts water | 47.5 | |
| (B) 4,540 parts sodium sulfite | 32.6 | 2.1 |
| (C) 2,772 parts methallyl chloride (98%) | 19.9 | 1.0 |
| | 100.0 | |

A was added to a glass reaction vessel equipped with sealed stirrer, thermometer and reflux condenser. B was added and the mixture heated to 60° C. While maintaining the temperature at 60–70° C., C was added through the reflux codenser at such a rate that some excess vaporized and refluxed in the condenser. About 10 hours was required to add the methallyl chloride. The mixture was allowed to react for 2 hours after final addition.

The reactor product was cooled to 10° C. with stirring and centrifuged. The product was isolated as one crop of crystals. The crystals were soft and snowy white. The product was dried in a vacuum oven at 60° C. There was obtained 3,748 parts of product out of a theoretical 4,740 parts or 79.2% yield. The product was pure and contained 0.57% NaCl.

Example 2

The general procedure described in Example 1 was repeated with the amount of water relative to sodium sulfite and methallyl chloride being varied between 42.5 and 47.5%. The amount of product yield and the content of by-product sodium chloride in the resulting product was then determined. The resulting data reported in the following table:

| Water present in charge, percent | Isolated yield, percent | NaCl present in product, percent |
|---|---|---|
| 47.5 | 79.2 | 0.57 |
| 45.0 | 80.0 | 3.2 |
| 42.5 | 82.0 | 5.6 |

The foregoing data indicate that although a decreasing percentage of water, as compared with the amount used in Example 1, gives a higher percentage yield of final product, this advantage is offset by the fact that the amount of contamination by by-product sodium chloride rapidly increases as the amount of water forming the reaction solution is lowered.

DISCUSSION OF DETAILS

The new methods are advantageously used for the production of sodium methallyl sulfonate by reaction of sodium sulfite with methallyl chloride. However, these methods may be employed for production of other alkali metal methallyl sulfonate salts, namely, the corresponding potassium and lithium salts.

The temperature at which the reaction between the alkali metal sulfite and methallyl chloride is conducted can be varied and will depend, to some extent, upon the pressure applied to the reaction mixture. At normal atmospheric pressure, the reaction is conducted with reflux of methallyl chloride, the reaction mass being then at a temperature about 60–70° C. Higher temperatures of reaction with shorter reaction time can be accomplished by the use of pressure vessels permitting reaction mixture to be heated to elevated temperatures, e.g., 80–100° C., without loss of methallyl chloride.

The water content of about 47–48% by weight of total reaction mass in combination with a mole ratio of alkali metal sulfite to methallyl chloride between 1.1:1 and 1.3:1 makes it possible upon crystallization of a single crop of crystals at a temperature in the range 8 to 15° C. in conjunction with centrifugation to obtain a yield of product of greater than 75% of theory, e.g., 75.5 to 79%, and having a by-product salt content less than 1%. In the preferred methods of the invention, sodium methallyl sulfonate is produced using a ratio of 1.2 moles of sodium sulfite for each mole of methallyl chloride with the reaction mass containing 47–48% by weight of water. In this manner, a product containing less than 1% sodium chloride in a yield of 79% can be obtained.

The embodiments of the invention in which an exclusive property or right is claimed are defined as follows:

1. In a process for the preparation of alkali metal methallyl sulfonate by reaction in aqueous medium of alkali metal sulfite with methallyl chloride forming alkali metal chloride as a by-product salt, the improvement that produces product of minimum by-product salt content which comprises in combination the steps:
   (a) using an alkali metal sulfite to methallyl chloride mole ratio between 1.3 to 1 and 1.1 to 1,
   (b) using a controlled amount of water in the reaction so that the reaction mass contains about 47 to 48% by weight of water, and
   (c) recovering the product from the reaction mass by adjusting the temperature of the reaction mass to between 8 and 15° C. to cause formation of crystals of the product sulfonate and centrifuging the crystals from the liquid mass.

2. A process as claimed in claim 1 wherein said sulfite is sodium sulfite.

3. A process as claimed in claim 2 wherein 1.2 moles of sodium sulfite are used for each mole of methallyl chloride charged into the reaction mass.

4. A process as claimed in claim 1 wherein the product yield is between 79 and 75.5% of theory and the crystal product contains less than 1% alkali metal chloride when isolated from the liquid phase as a single crop of crystals.

References Cited

FOREIGN PATENTS 379,972   1/1962   Japan.

DANIEL D. HORWITZ, *Primary Examiner.*